(12) United States Patent
Kim et al.

(10) Patent No.: US 9,048,480 B2
(45) Date of Patent: Jun. 2, 2015

(54) ANION EXCHANGE POLYMER ELECTROLYTES

(75) Inventors: Yu Seung Kim, Los Alamos, NM (US); Dae Sik Kim, Daejeon (KR)

(73) Assignee: LOS ALAMOS NATIONAL SECURITY, LLC, Los Alamos, NM (US)

( * ) Notice: Subject to any disclaimer, the term of this patent is extended or adjusted under 35 U.S.C. 154(b) by 0 days.

(21) Appl. No.: 13/584,183

(22) Filed: Aug. 13, 2012

(65) Prior Publication Data
US 2014/0024728 A1 Jan. 23, 2014

Related U.S. Application Data

(60) Provisional application No. 61/522,478, filed on Aug. 11, 2011, provisional application No. 61/448,834, filed on May 1, 2012.

(51) Int. Cl.
| | | |
|---|---|---|
| *H01M 4/62* | (2006.01) | |
| *C08J 5/22* | (2006.01) | |
| *H01M 8/10* | (2006.01) | |
| *H01M 4/36* | (2006.01) | |
| *B01J 41/12* | (2006.01) | |
| *H01M 8/08* | (2006.01) | |

(52) U.S. Cl.
CPC ............ *H01M 8/1039* (2013.01); *H01M 4/623* (2013.01); *H01M 4/36* (2013.01); *B01J 41/125* (2013.01); *C08J 5/22* (2013.01); *Y02E 60/521* (2013.01); *H01M 8/083* (2013.01); *H01M 8/1025* (2013.01); *C08J 5/2262* (2013.01)

(58) Field of Classification Search
USPC ...................... 521/27, 30; 429/484
See application file for complete search history.

(56) References Cited

U.S. PATENT DOCUMENTS

| | | |
|---|---|---|
| 4,659,744 A | 4/1987 | Matsui et al. |
| 4,923,611 A | 5/1990 | Hanada et al. |
| 5,746,917 A | 5/1998 | Altmeier et al. |
| 5,998,057 A | 12/1999 | Koschany et al. |
| 6,780,893 B2 | 8/2004 | Sugaya et al. |
| 7,081,484 B2 | 7/2006 | Sugaya et al. |
| 7,439,275 B2 | 10/2008 | Pivovar |
| 7,582,683 B2 | 9/2009 | Pivovar et al. |
| 7,846,980 B2 | 12/2010 | Pivovar |
| 2005/0233221 A1 | 10/2005 | Araki et al. |

(Continued)

FOREIGN PATENT DOCUMENTS

WO 03098205 11/2003

OTHER PUBLICATIONS

Wang et al., "Novel Hydroxide-Conducting Polyelectrolyte Composed of an Poly(arylene ether sulfone) Containing Pendant Quaternary Guanidinium Groups for Alkaline Fuel Cell Applications," Macromolecules, Mar. 22, 2010, vol. 43, pp. 3890-3896.*

(Continued)

*Primary Examiner* — Peter D Mulcahy
*Assistant Examiner* — Henry Hu
(74) *Attorney, Agent, or Firm* — Samuel L. Borkowsky; Bruce H. Cottrell

(57) ABSTRACT

Anion exchange polymer electrolytes that include guanidinium functionalized polymers may be used as membranes and binders for electrocatalysts in preparation of anodes for electrochemical cells such as solid alkaline fuel cells.

8 Claims, 10 Drawing Sheets

ANION EXCHANGE MEMBRANE

(56) References Cited

U.S. PATENT DOCUMENTS

| | | |
|---|---|---|
| 2006/0217526 A1 | 9/2006 | Pivovar et al. |
| 2008/0124604 A1 | 5/2008 | Moussaoui et al. |
| 2009/0208848 A1 | 8/2009 | Cho et al. |
| 2009/0212253 A1 | 8/2009 | Kinouchi et al. |
| 2009/0318575 A1 | 12/2009 | Pivovar et al. |
| 2010/0183804 A1 | 7/2010 | Kim et al. |
| 2012/0225371 A1* | 9/2012 | Kim et al. ............... 429/484 |

OTHER PUBLICATIONS

Zhang et al., "A novel guanidinium grafted poly(aryl ether sulfone) for high-performance hydroxide exchange membranes," Chem. Comm., Sep. 16, 2010, vol. 46, pp. 7495-7497.*
Li et al., "A Novel Bisphenol Monomer with Grafting Capability and the Resulting Poly(arylene ether sulfone)s," Macromolecules, Sep. 6, 2006, vol. 39, pp. 6990-6996.*
Varcoe et al., "An Alkaline Polymer Electrochemical Interface: a Breakthrough in Application of Alkaline Anion-Exchange Membranes in Fuel Cells," Chem. Commun. 2006, pp. 1428-1429.*
Bauer et al., "Anion-Exchange Membranes with Improved Alkaline Stability," Desalination, 1990, vol. 79, pp. 125-1441.
Hibbs et al., "Poly(Phenylene)-Based Anion-Exchange Membranes for Alkaline Fuel Cells," North American Membrane Society (NAMS) meeting, 2011, Jun. 4-8, 2011.
Wang et al., "Synthesis of Soluble Poly(arylene ether sulfone) Ionomers with Pendant Quaternary Ammonium Groups for Anion Exchange Membrane," Macromolecules, Sep. 10, 2009, vol. 42, pp. 8711-8717.
Varcoe et al., "Prospects for Alkaline Anion-Exchange Membranes in Low Temperature Fuel Cells," Fuel Cells, Apr. 2005, vol. 5, pp. 187-200.
Spendelow et al., "Electrocatalysis of Oxygen Reduction and Small Alcohol Oxidation in Alkaline Media," Physical Chemistry Chemical Physics, May 2007, vol. 9, pp. 2654-2675.
Lu et al., "Alkaline Polymer Electrolyte Fuel Cells Completely Free from Noble Metal Catalysts," PNAS, Dec. 2008, vol. 105, pp. 20611-20614.
Varcoe et al., "Poly(ethylene-co-tetrafluoroethylene)-Derived Radiation-Grafted Anion-Exchange Membrane with Properties Specifically Tailored for Application in Metal-Cation-Free Alkaline Polymer Electrolyte Fuel Cells," Chem. Mater, Apr. 24, 2007, vol. 19, pp. 2686-2693, (Published on web Apr. 24, 2007).
Hibbs et al., "Transport Properties of Hydroxide and Proton Conducting Membranes," Chem. Mater., Mar. 11, 2008, vol. 20, pp. 2566-2573, (Published on web Mar. 11, 2008).
Pan et al., "High-Performance Alkaline Polymer Electrolyte for Fuel Cell Applications," Advanced Functional Materials, Jan. 22, 2010, vol. 20, pp. 312-319.
Tanaka et al., "Anion Conductive Aromatic Ionomers Containing Fluorenyl Groups," Macromolecules, Feb. 16, 2010, vol. 43, pp. 2657-2659.
Yan et al., "Anion Exchange Membranes by Bromination of Benzylmethyl-Containing Poly(sulfone)s," Macromolecules, Feb. 5, 2010, vol. 43, pp. 2349-2356.
Robertson et al., "Tunable High Performance Cross-Linked Alkaline Anion Exchange Membranes for Fuel Cell Applications," J. Am. Chem. Soc., Feb. 23, 2010, vol. 132, pp. 3400-3404.
Bauer et al., "Anion-Exchange Membranes with Improved Alkaline Stability," Desalination, 1990, vol. 79, pp. 125-144.
Chempath et al., "Mechanism of Tetraalkylammonium Headgroup Degradation in Alkaline Fuel Cell Membranes," Journal of Physical Chemistry C, Feb. 9, 2008, vol. 112, pp. 3179-3182.
Gu et al., "A Soluble and Highly Conductive Ionomer for High-Performance Hydroxide Exchange Membrane Fuel Cells," Angew. Chem. Int. Ed., Aug. 17, 2009, vol. 48, pp. 6499-6502.
Chempath et al., "Density Functional Theory Study of Degradation of Tetraalkylammonium Hydroxide," J. Phys. Chem. C, Jun. 22, 2010, vol. 114, pp. 11977-11983.
Kim et al., "Comb-Shaped Poly(arylene ether sulfone)s as Proton Exchange Membranes," Macromolecules, Feb. 23, 2008, vol. 41, pp. 2126-2134.
Zhou et al., "Crosslinked, Epoxy-Based Anion Conductive Membranes for Alkaline Membrane Fuel Cells," Journal of Membrane Science, Jan. 11, 2010, vol. 350, pp. 286-292, (available online Jan. 11, 2010).
Huczynski et al., "Molecular Structure and Spectroscopic Study of N,N-Dimethylisoindoline-2-Carboxamide—A New Unsymmetrical Urea Obtained in One-Pot Synthesis," Journal of Molecular Structure, Dec. 28, 2010, vol. 967, pp. 65-71, (available online Dec. 28, 2009).
Wang et al., "Synthesis of Soluble Poly(arylene ether sulfone) Ionomers with Pendant Quaternary Ammonium Groups for Anion Exchange Membranes," Macromolecules, Sep. 10, 2009, vol. 42, pp. 8711-8717.
Agel et al., "Characterization and use of Anionic Membranes for Alkaline Fuel Cells," J. Power Sources, 2001, vol. 101, pp. 267-271.
Miyazaki et al., "Aminated Perfluorosulfonic Acid Ionomers to Improve the Triple Phase Boundary Region in Anion-Exchange Membrane Fuel Cells," Journal of the Electrochemical Society, 2010, vol. 157, pp. A1153-A-1157, published Sep. 1, 2010.
Pandey et al., "Formation and Characterization of Highly Crosslinked Anion Exchange Membranes," J. Memb. Sci., 2003, vol. 217, pp. 117-130.
Sata et al., "Permselectivity Between Two Anions in Anion Exchange Membranes Crosslinked with Various Diamines in Electrodialysis," J. Polym. Sci. Polym. Chem., 1996, vol. 34, pp. 1475-1482.

* cited by examiner

ANION EXCHANGE POLYMER ELECTROLYTES

RELATED APPLICATIONS

This application claims the benefit of U.S. Provisional Application No. 61/522,478 entitled "Guanidinium-Functionalized Anion Exchange Polymer Electrolytes via Activated Fluorophenyl-Amine Reaction," filed Aug. 11, 2011, and is a continuation-in-part of Ser. No. 121,575 entitled "Ionomer for Alkaline Fuel Cell," filed Mar. 1, 2012, which claimed the benefit of U.S. Provisional Application Number 61,448,834 entitled "Ionomer for Alkaline Fuel Cell" which was filed Mar. 3, 2011, all hereby incorporated by reference.

STATEMENT REGARDING FEDERAL RIGHTS

This invention was made with government support under Contract No. DE-AC52-06NA25396 awarded by the U.S. Department of Energy. The government has certain rights in the invention.

FIELD OF THE INVENTION

The present invention relates generally to anion exchange polymer electrolytes and to fuel cells that include anion exchange polymer electrolytes.

BACKGROUND OF THE INVENTION

Fuel cells convert the chemical energy of fuel into electrical energy. Examples of fuel cells are polymer electrolyte fuel cells ("PEFCs") and alkaline fuel cells ("AFCs"). PEFCs have a relatively simple cell design and use a gaseous fuel (e.g. hydrogen, dimethyl ether and the like) or liquid fuel (e.g. methanol, ethanol, ethylene glycol, glycerol, hydrazine, and the like) that can easily be delivered to the cell and has a high energy density. PEFCs require expensive precious metals (e.g. platinum) as electrocatalysts, and operate under acidic conditions, for which the reduction of oxygen and/or the oxidation of the liquid fuel is slow. By contrast, AFCs may use relatively inexpensive catalysts made from base metals (i.e. non-precious metals) that tend to have a high activity under alkaline conditions.

A schematic diagram of a solution-based, $H_2$/air AFC is shown in FIG. 1. The half reactions at the anode and cathode are:

As FIG. 1 shows, oxygen passes through the cathode gas diffusion layer (GDL) to the cathode where it reacts with water and electrodes to form hydroxide ions ($OH^-$). The hydroxide ions generated at the cathode are transported through an anion exchange membrane to the anode. Hydrogen fuel passes through the anode gas diffusion layer where it reacts with the hydroxide to generate water and electrons. Electrons flow through an external circuit from the anode to the cathode.

A solid alkaline fuel cell ("SAFC") is a type of AFC that has a solid electrolyte. Solid alkaline fuel cells have certain advantages compared to liquid electrolytes. For example, solid electrolytes occupy a smaller volume than liquid electrolytes do, and solid electrolytes are also less corrosive than liquid electrolytes are.

Currently, the performance and durability of solid alkaline fuel cells ("SAFCs") is inferior to that for polymer electrolyte fuel cells ("PEFCs"). This is due, at least in part, to the conductivity, mechanical properties, and degradation of the polymeric materials used in the membranes and electrodes of SAFCs. PEFCs use solid electrolytes that are cation exchange polymer membranes while SAFCs use solid electrolytes that are anion exchange polymer membranes. Anion exchange membranes tend to exhibit lower ion conductivities than the cation exchange membranes. Anion exchange membranes also tend to have poorer mechanical properties than the cation exchange membranes have. Anion exchange membranes also tend to degrade faster under fuel cell operating conditions than the cation exchange polymer membranes do. There are also problems associated with the electrodes for SAFCs. Electrode reactions for SAFCs occur at the interface between electro catalysts and polymer electrolytes. A significant loss in fuel cell performance is due to, i) degradation of cation functional groups under high pH conditions and ii) strong cation absorption on the surface of the electrocatalyst. Despite the known problems associated with alkaline exchange polymers, renewed interest has grown in the development of alkaline fuel cells in recent years because the efficiency of the oxygen reduction reaction of electrocatalysts in alkaline environment is likely greater than in an acidic environment and therefore, expensive platinum based catalysts can be replaced with inexpensive ones such as nickel, silver and carbon [1, 2, 3].

Quaternary ammonium-tethered anion exchange polymer electrolytes [4, 5, 6, 7, 8, 9] have been the most extensively studied. Degradation of alkyl ammonium-based polymer electrolytes occurs under high pH conditions via i) Hoffmann elimination ($E_2$) ii) nucleophilic substitution ($S_N2$) [10] or iii) ylide formation [11]. Although the $E_2$ reaction can be circumvented by avoiding a coplanar arrangement of β-hydrogen and nitrogen or by synthesizing β-hydrogen-absent quaternary ammoniums, most of the alkyl ammonium functionalized polymers still have not realized sufficient stability due to the $S_N2$ reaction. In the $S_N2$ reaction, hydroxide ions attack the α-carbon of the ammonium cations [12]. The extent of polymer degradation via the $S_N2$ reaction may be reduced by replacing alkyl ammonium with bulky cations such as guanidinium or phosphonium, which stabilize the α-carbon-nitrogen bond by charge delocalization of the cations [11]. Degradation through the ylide pathway starts with hydroxide ion attack on a $CH_3$ proton and produces a water molecule along with an ylide intermediate ($N(CH_3)_3{}^+CH_2{}^-$). In addition, quaternized ammonium tethered to anion exchange polymer electrolytes have adhered strongly on the surface of electrocatalyst and lower the efficiency of electro-chemical reactions.

Most cation-functionalized polymer electrolytes have been prepared via chlorination, or bromination, of methyl groups followed by cationization of the resulting halomethyl group [7, 8, 13, 14]. Benzyl guanidiniums, however, degrade via the nucleophilic attack by hydroxide ion at the benzylic cation [15]. In addition, the degradation of benzyl ammonium through ylide formation and subsequent rearrangement reactions may limit the lifetime of the polymers [16].

SUMMARY OF THE INVENTION

In accordance with the purposes of the present invention, as embodied and broadly described herein, an aspect of the present invention is a composition having the formula

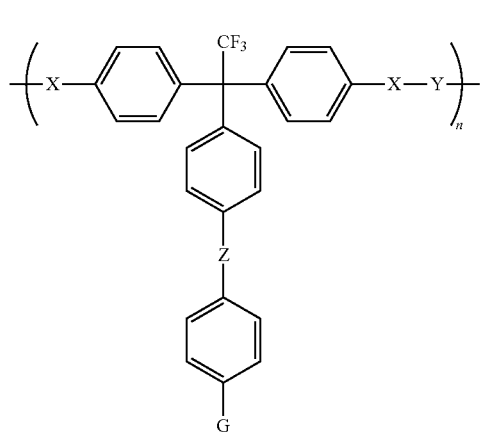

wherein X is S or O;
wherein Y is

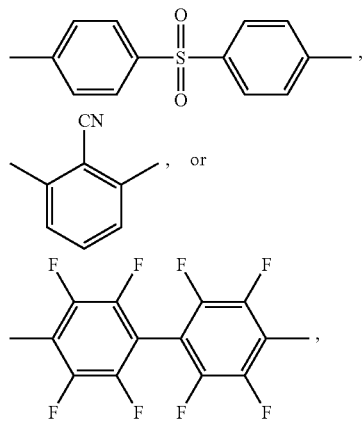

wherein Z is SO$_2$ or S,
wherein n is from 1 to 1000, and
wherein G is a guanidine or a guanidinium, said guanidine having the formula

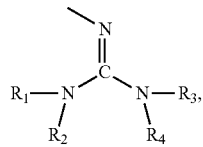

said guanidinium having the formula

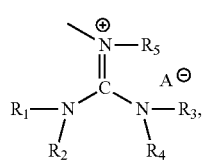

wherein R$_1$, R$_2$, R$_3$, and R$_4$ are each independently selected from —H, —CH$_3$, —NH$_2$, —N(=O), —NO$_2$, —CN, —(CH)$_m$CH$_3$ wherein m=1-6, HC(=O)—, CH$_3$C(=O)—, NH$_2$C(=O)—, —(CH$_2$)$_m$COOH where m=1-6, —(CH$_2$)$_m$CH(NH$_2$)—COOH where m=1-6, —CH(COOH)—CH$_2$—COOH, —CH$_2$—CH(O—CH$_2$CH$_3$)$_2$, —(C=S)—NH$_2$, —(C=NH)—N((CH$_2$)$_{n1}$(CH$_3$)((CH$_2$)$_{2)n2}$(CH$_3$)) where n$_1$=0-6 and n$_2$=0-6, —NH—(C=S)—SH, —CH$_2$—C(=O)—O—C(CH$_3$)$_3$, —O—(CH$_2$)$_m$—CH(NH$_2$)—COOH where m=1-6, —(CH$_2$)$_m$—CH=CH$_2$ wherein m=1-6, —(CH$_2$)$_m$—CH$_2$—CN where m=1-6, an aromatic group, a halide, or halide—substituted methyl group,
wherein R$_5$=alkyl, and
wherein A$^-$ is a counterion.

Another aspect of the invention is an article, such as an electrode, that includes an electrocatalyst in contact with a binder composition having the formula

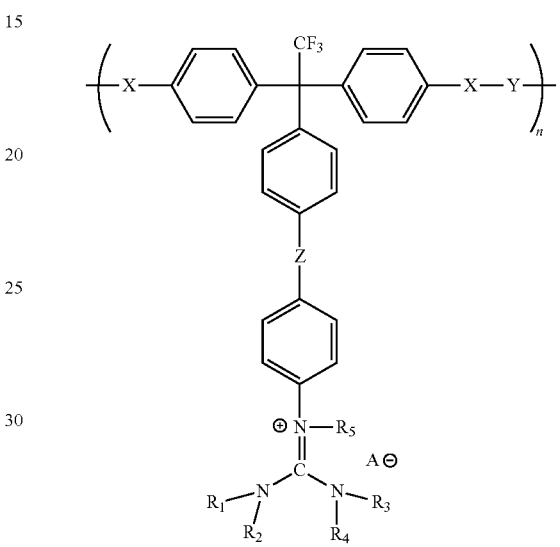

wherein n is from about 5 to about 1000,
wherein X is S or O;
wherein Y is

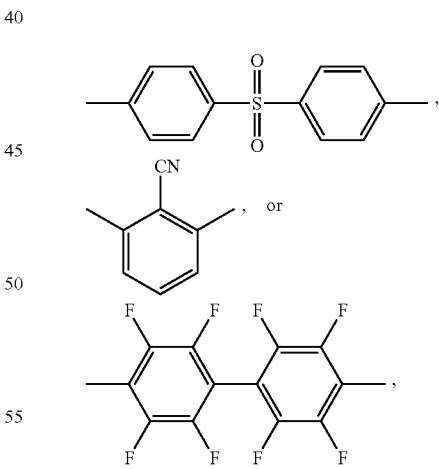

wherein Z is SO$_2$ or S,
wherein R$_1$, R$_2$, R$_3$, and R$_4$ are each independently selected from —H, —CH$_3$, —NH$_2$, —N(=O), —NO$_2$, —CN, —(CH)$_m$CH$_3$ wherein m=1-6, HC(=O)—, CH$_3$C(=O)—, NH$_2$C(=O)—, —(CH$_2$)$_m$COOH where m=1-6, —(CH$_2$)$_m$—CH(NH$_2$)—COOH where m=1-6, —CH(COOH)—CH$_2$—COOH, —CH$_2$—CH(O—CH$_2$CH$_3$)$_2$, —(C=S)—NH$_2$, —(C=NH)—N((CH$_2$)$_{n1}$(CH$_3$)((CH$_2$)$_{2)n2}$(CH$_3$)) where n$_1$=0-6 and n$_2$=0-6, —NH—

(C=S)—SH, —CH$_2$—C(=O)—O—C(CH$_3$)$_3$, —O—(CH$_2$)$_m$—CH(NH$_2$)—COOH where m=1-6, —(CH$_2$)$_m$—CH=CH$_2$ wherein m=1-6, —(CH$_2$)$_m$—CH$_2$—CN where m=1-6, an aromatic group, a halide, or halide—substituted methyl group,
wherein R$_5$=alkyl,
wherein A$^-$ is a counterion.

Another aspect of the invention is a fuel cell that includes an anion exchange polymer electrolyte composition of the formula

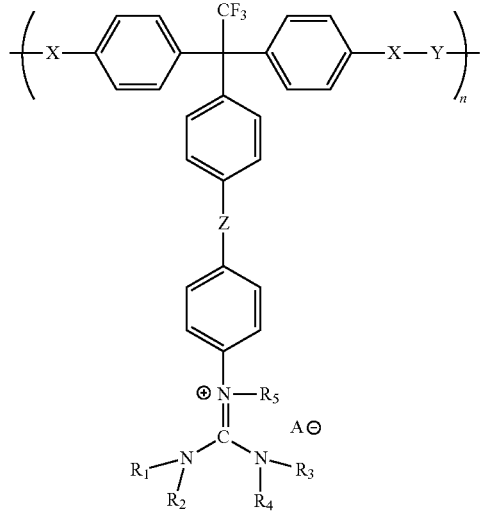

wherein n is from about 5 to about 1000,
wherein X is S or O;
wherein Y is

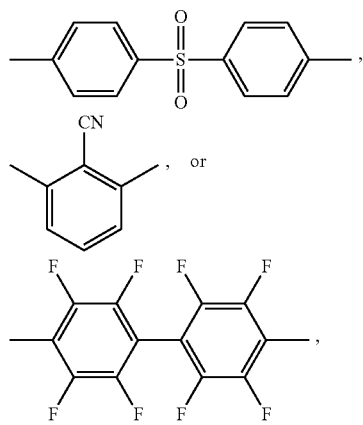

wherein Z is SO$_2$ or S,
wherein R$_1$, R$_2$, R$_3$, and R$_4$ are each independently selected from —H, —CH$_3$, —NH$_2$, —N(=O), —NO$_2$, —CN, —(CH)$_m$CH$_3$ wherein m=1-6, HC(=O)—, CH$_3$C(=O)—, NH$_2$C(=O)—, —(CH$_2$)$_m$COOH where m=1-6, —(CH$_2$)$_m$—CH(NH$_2$)—COOH where m=1-6, —CH(COOH)—CH$_2$—COOH, —CH$_2$—CH(O—CH$_2$CH$_3$)$_2$, —(C=S)—NH$_2$, —(C=NH)—N((CH$_2$)$_{n1}$(CH$_3$)((CH$_2$)$_{n2}$(CH$_3$)) where n$_1$=0-6 and n$_2$=0-6, —NH—(C=S)—SH, —CH$_2$—C(=O)—O—C(CH$_3$)$_3$, —O—(CH$_2$)$_m$—CH(NH$_2$)—COOH where m=1-6, —(CH$_2$)$_m$—CH=CH$_2$ wherein m=1-6, —(CH$_2$)$_m$—CH$_2$—CN where m=1-6, an aromatic group, a halide, or halide—substituted methyl group, wherein R$_5$=alkyl, wherein A$^-$ is a counterion.

BRIEF DESCRIPTION OF THE DRAWINGS

The accompanying drawings are incorporated in and form a part of the specification. In the drawings.

DETAILED DESCRIPTION

Figure 1:
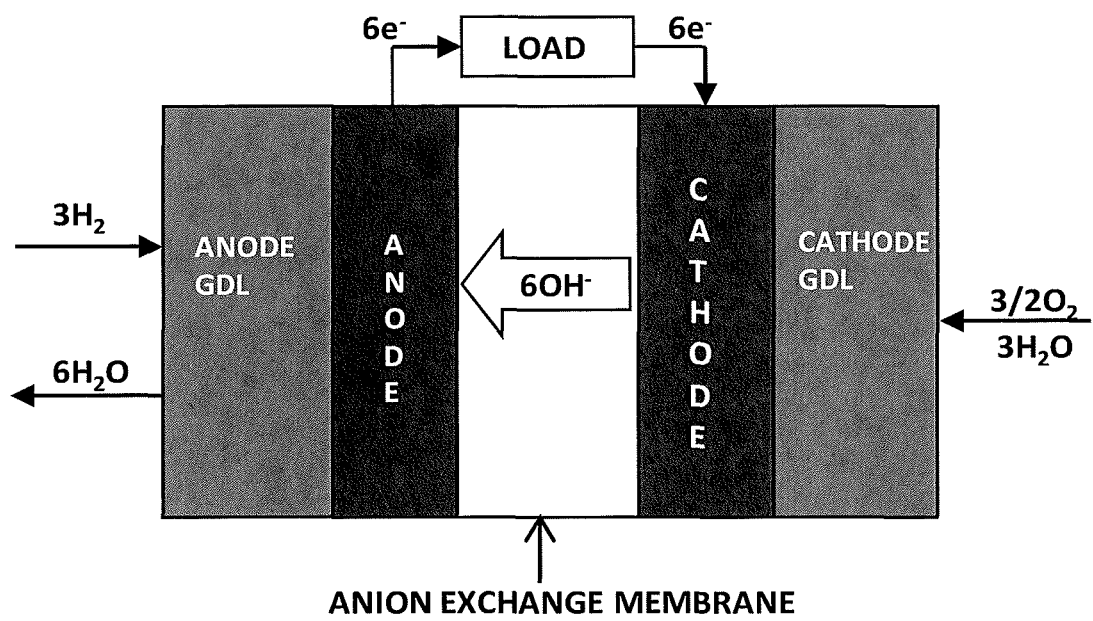
FIG. 1 shows a schematic diagram of a schematic diagram of a solution-based, H$_2$/air alkaline fuel cell.

An aspect of this invention relates to a composition having the formula

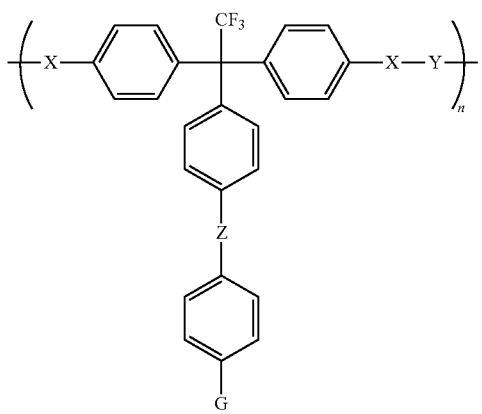

wherein X is S or O;
wherein Y is

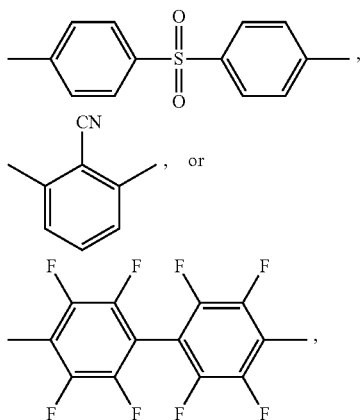

wherein Z is SO$_2$ or S,
wherein n is from 1 to 1000, and
wherein G is a guanidine or a guanidinium, said guanidine having the formula

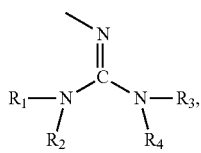

said guanidinium having the formula

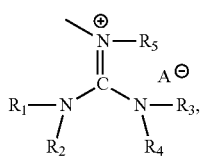

wherein $R_1$, $R_2$, $R_3$, and $R_4$ are each independently selected from —H, —CH$_3$, —NH$_2$, —N(=O), NO$_2$, —CN, —(CH)$_m$CH$_3$ wherein m=1-6, HC(=O)—, CH$_3$C(=O)—, NH$_2$C(=O)—, —(CH$_2$)$_m$COOH where m=1-6, —(CH$_2$)$_m$—CH(NH$_2$)—COOH where m=1-6, —CH(COOH)—CH$_2$—COOH, —CH$_2$—CH(O—CH$_2$CH$_3$)$_2$, —(C=S)—NH$_2$, —(C=NH)—N((CH$_2$)$_{n1}$(CH$_3$)((CH$_2$)$_{n2}$(CH$_3$)) where $n_1$=0-6 and $n_2$=0-6, —NH—(C=S)—SH, —CH$_2$—C(=O)—O—C(CH$_3$)$_3$, —O—(CH$_2$)$_m$—CH(NH$_2$)—COOH where m=1-6, —(CH$_2$)$_m$—CH=CH$_2$ wherein m=1-6, —(CH$_2$)$_m$—CH$_2$—CN where m=1-6, an aromatic group, a halide, or halide—substituted methyl group,
wherein $R_5$=alkyl, and
wherein $A^-$ is a counterion.

Another aspect of this invention relates to fuel cell that includes an electrocatalyst in contact with a binder composition having the formula

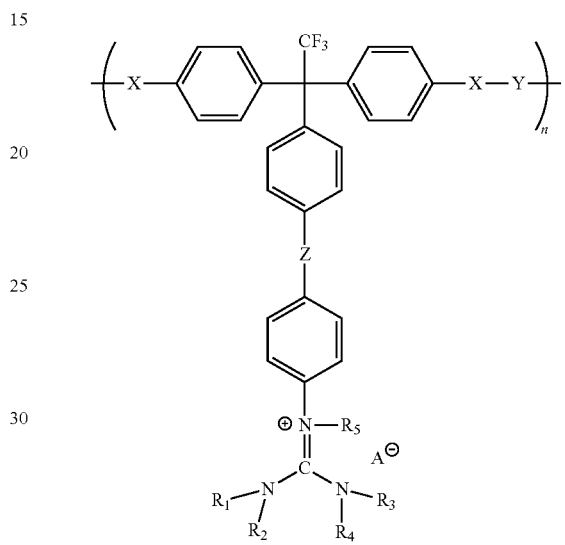

wherein X is S or O;
wherein Y is

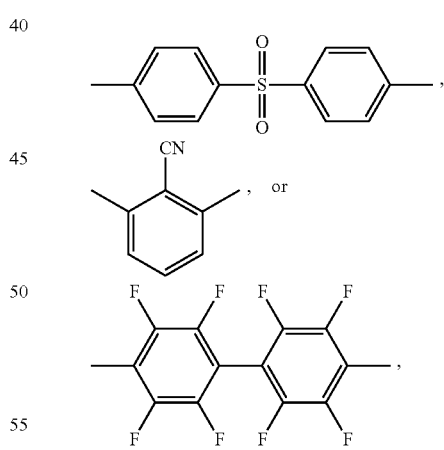

wherein Z is SO$_2$ or S,
wherein $R_1$, $R_2$, $R_3$, $R_4$, and $R_5$ are each independently selected from —H, —CH$_3$, —NH$_2$, —N(=O), NO$_2$, —CN, —(CH)$_m$CH$_3$ wherein m=1-6, HC(=O)—, CH$_3$C(=O)—, NH$_2$C(=O)—, —(CH$_2$)$_m$COOH where m=1-6, —(CH$_2$)$_m$—CH(NH$_2$)—COOH where m=1-6, —CH(COOH)—CH$_2$—COOH, —CH$_2$—CH(O—CH$_2$CH$_3$)$_2$, —(C=S)—NH$_2$, —(C=NH)—N((CH$_2$)$_{n1}$(CH$_3$)((CH$_2$)$_{n2}$(CH$_3$)) where $n_1$=0-6 and $n_2$=0-6, —NH—(C=S)—SH, —CH$_2$—C(=O)—O—C(CH$_3$)$_3$, —O—

$(CH_2)_m$—$CH(NH_2)$—COOH where m=1-6, —$(CH_2)_m$—CH=$CH_2$ wherein m=1-6, —$(CH_2)_m$—$CH_2$—CN where m=1-6, an aromatic group, a halide, or halide-substituted methyl group, wherein $R_5$=alkyl, wherein n is from 5 to 1000, and wherein $A^-$ is a counterion.

Embodiment alkaline exchange polymer electrolytes are ionomers that may be used with solid alkaline fuel cells (SAFCs). Embodiment ionomers were prepared by reacting guanidines with activated fluorophenyl groups of polymers, and alkylating (e.g. methylating) the resulting guanidine groups to guanidiniums Embodiment ionomers were also prepared by directly reacting guanidiniums with halomethyl groups of polymers without alkylating procedures (1,1,2,3,3-pentamethylguanidine (PMG) was prepared, for example, by reaction of bis-dimethylaminoformaldehyde with oxalyl chloride followed by reaction with methylamine.

The electrochemical properties and stability of various embodiment compositions that are alkaline exchange polymer electrolytes were investigated under ex-situ and AMFC operating conditions.

Scheme 1 below shows an embodiment synthetic procedure for preparing an embodiment electrolyte composition abbreviated as M-PAES-TMG.

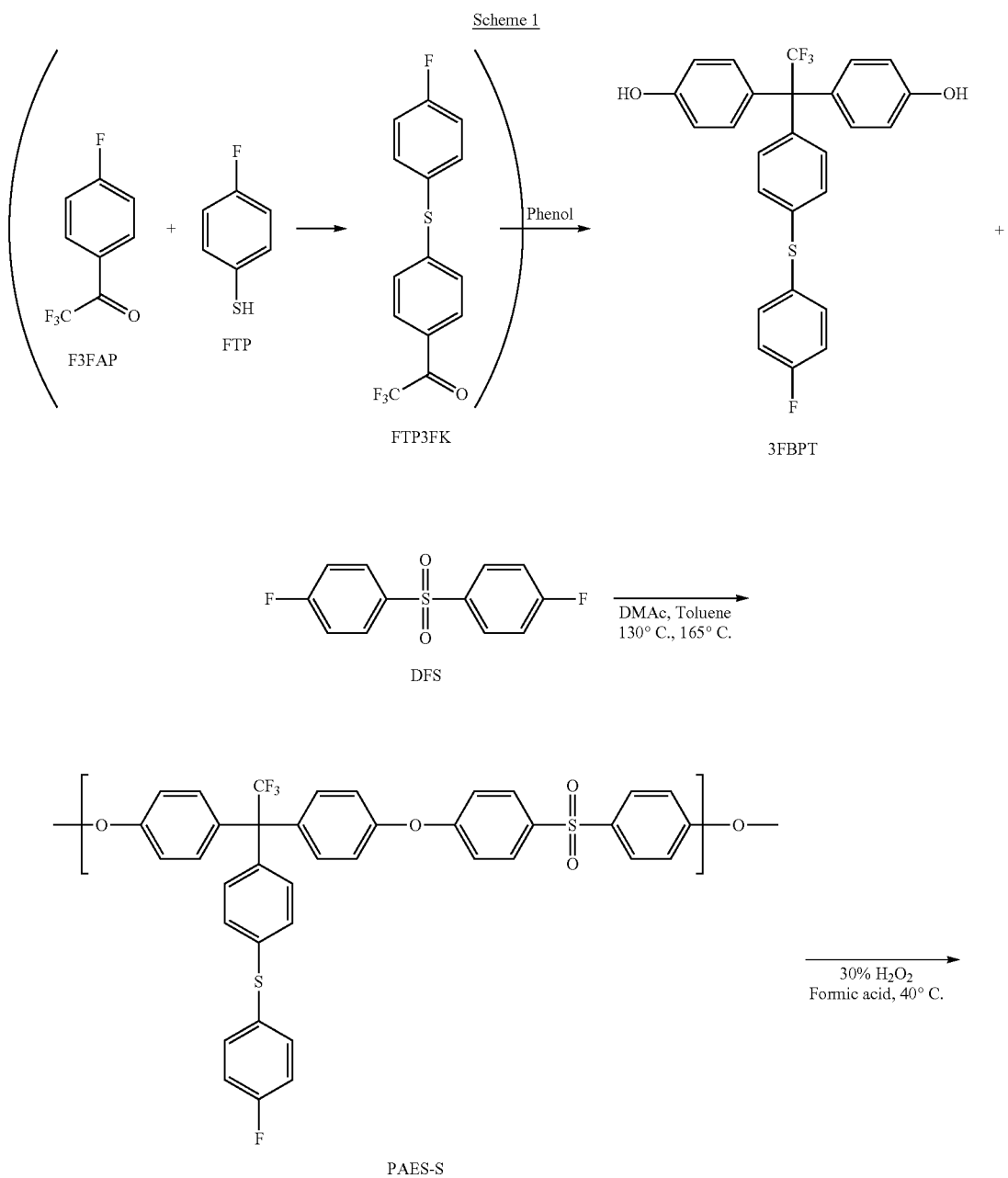

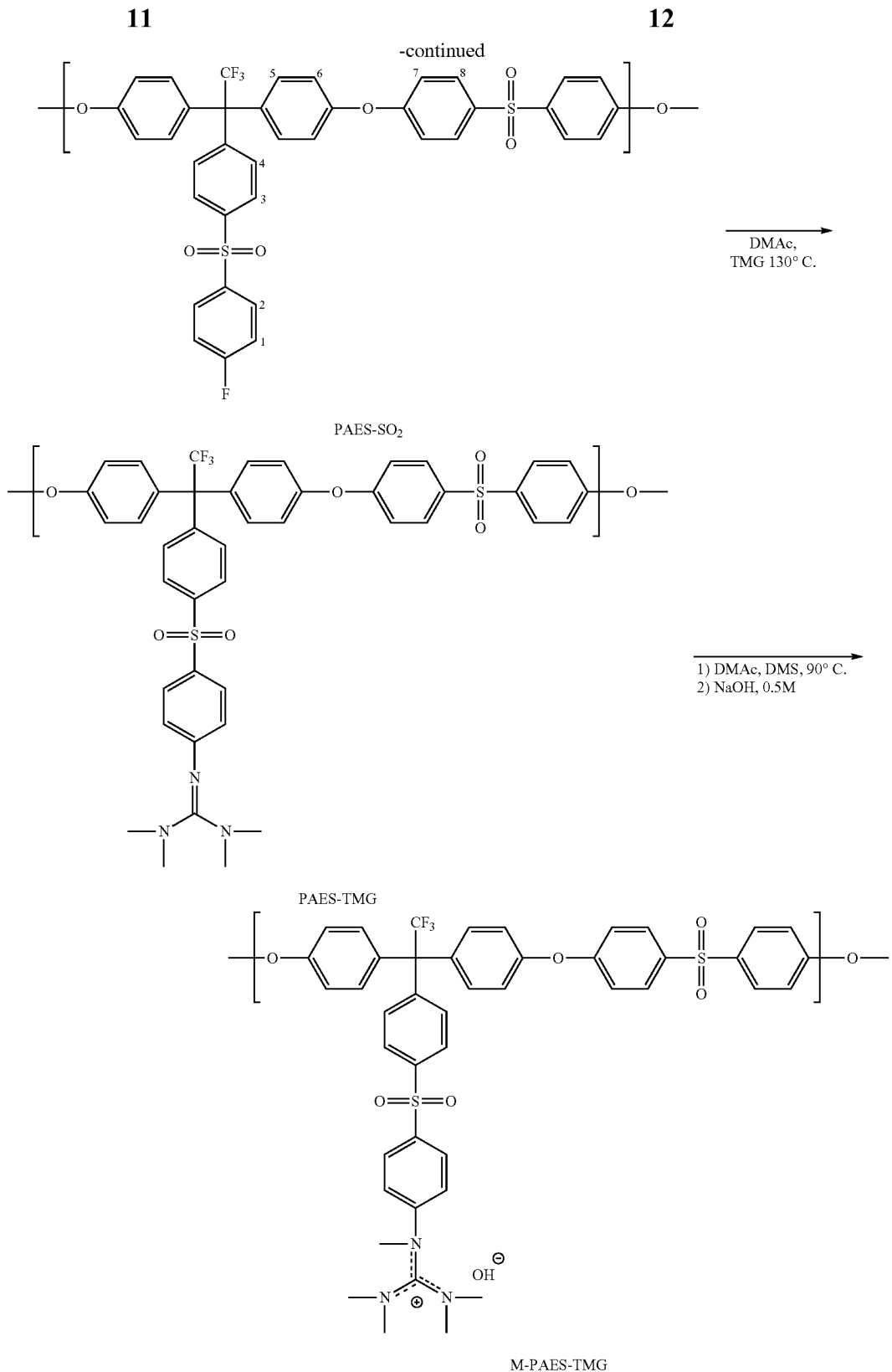

PAES-SO₂

PAES-TMG

M-PAES-TMG

As Scheme 1 shows, the M-PAES-TMG electrolyte composition was prepared from the embodiment neutral composition abbreviated as PAES-TMG by reaction first with dimethyl sulfate, which results in alkylation (in this case methylation) of the imino-nitrogen to produce the electrolyte polymer with methylsulfate counterion. Ion exchange with hydroxide replaces methylsulfate with hydroxide and forms the M-PAES-TMG. The PAES-TMG composition is an embodiment of the more general composition shown above in which:

X=O,

Y = 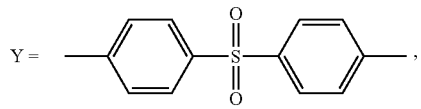,

Z=SO$_2$,

G = 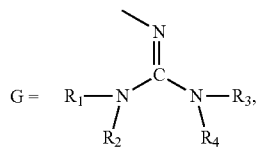

and
R$_1$=R$_2$=R$_3$=R$_4$=methyl (i.e. —CH$_3$). The M-PAES-TMG is an embodiment composition wherein R$_5$ is methyl and the counterion is hydroxide. The chemistry of Scheme 1 begins with the synthesis of the molecule abbreviated as 3FBPT. The 1,1-bis(4-hydroxyphenyl)-1-(4-((4-fluorophenyl)-thio)phenyl-2,2,2-trifluoroethane) (3FBPT) monomer was synthesized by the nucleophilic displacement of fluorine on 4-fluoro-2,2,2-trifluoroacetophenone (F3FAP) by 4-fluorothiophenol (FTP), followed by a phenol condensation reaction [17, 18]. Poly(arylene ether sulfone) containing pendant 4-fluorophenyl sulfide groups (PAES-S) was synthesized by nucleophilic aromatic substitution (S$_N$Ar) polycondensation using 3FBPT and 4,4'-difluorodiphenylsulfone (DFS). The pendant 4-fluorophenyl groups of the polymer were activated by oxidizing sulfide to sulfone with hydrogen peroxide in formic acid polymer suspension to give PAES-SO$_2$. The molecular weight of PAES-SO$_2$ was 50.2 kg/mol (M$_n$) and 75.6 kg/mol (M$_W$) (PDI=1.51) [19]. The excellent reactivity of the fluorine atom on the pendant group was demonstrated by the reaction of PAES-SO$_2$ with 1,1,3,3-tetramethylguanidine (TMG) at 130° C. in DMAc. In this PAES-TMG system, it is unnecessary to prepare a pentamethyl guanidinium, since commercially available TMG reacts directly with the fluorophenyl group of PAES-SO$_2$. The PAES-TMG polymer was converted to an alkylated polymer, in this case a methylated polymer (M-PAES-TMG), by reaction with dimethyl sulfate (DMS) at 90° C. for 12 hours.

It should be understood that the invention is not limited to the PAES-TMG and M-PAES TMG, and that other embodiments also fall within the scope of this invention. In the embodiment shown above wherein tetramethylguanidine reacts with the polymer to form the guanidine-substituted embodiment, tetramethylguanidine is represented by the formula

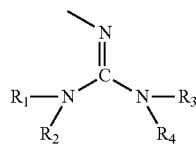

wherein R$_1$, R$_2$, R$_3$, and R$_4$ are —CH$_3$ groups.

It should be understood that although the particular embodiment compositions that include tetramethylguanidine and methyl-tetramethylguanidinium groups will be described in great detail, other guanidine and guanidinium-containing embodiments also fall within the scope of this invention in which R$_1$, R$_2$, R$_3$, R$_4$, and R$_5$ are each independently selected from —H, —CH$_3$, —NH$_2$, —N(=O), —NO2, —CN, —(CH)$_m$CH$_3$ wherein m=1-6, HC(=O)—, CH$_3$C(=O)—, NH$_2$C(=O)—, —(CH$_2$)$_m$COOH where m=1-6, —(CH$_2$)$_m$—CH(NH$_2$)—COOH where m=1-6, —CH—(COOH)—CH$_2$—COOH, —CH$_2$—CH(O—CH$_2$CH$_3$)$_2$, —(C=S)—NH$_2$, —(C=NH)—N—(CH$_2$)$_{n1}$(CH$_3$)((CH$_2$)$_{n2}$(CH$_3$) where n$_1$=0-6 and n$_2$=0-6, —NH—(C=S)—SH, —CH$_2$—C(=O)—O—C(CH$_3$)$_3$, —O—(CH$_2$)$_m$—CH—(NH$_2$)—COOH, where m=1-6, —(CH$_2$)$_m$—CH=CH wherein m=1-6, —(CH$_2$)$_m$—CH$_2$—CN where m=1-6, an aromatic group, a halide, or halide-substituted methyl group. The aromatic group may be phenyl, benzyl, phenoxy, methylbenzyl, nitrogen-substituted benzyl, or nitrogen-substituted phenyl. After forming the guanidine-functionalized embodiment polymer, methylation results in an embodiment methyl-guanidinium-functionalized polymer. More generally, alkylation of the nitrogen bound to the phenyl results in an embodiment alkylguanidinium-functionalized polymer. The embodiment of Scheme 1 shows hydroxide as the counterion. More generally, embodiment counterions include hydroxide (OH—), carbonate (CO$_3^{-2}$), bicarbonate (HCO$_3^-$), fluoride (F$^-$), chloride (Cl$^-$), bromide (Br$^-$), iodide (I$^-$), IO$_3^-$, SO$_4^{-2}$, HSO$_3^-$, H$_2$PO$_4^-$, NO$_3^-$, and CH$_3$OSO$_3^-$.

Figure 2:
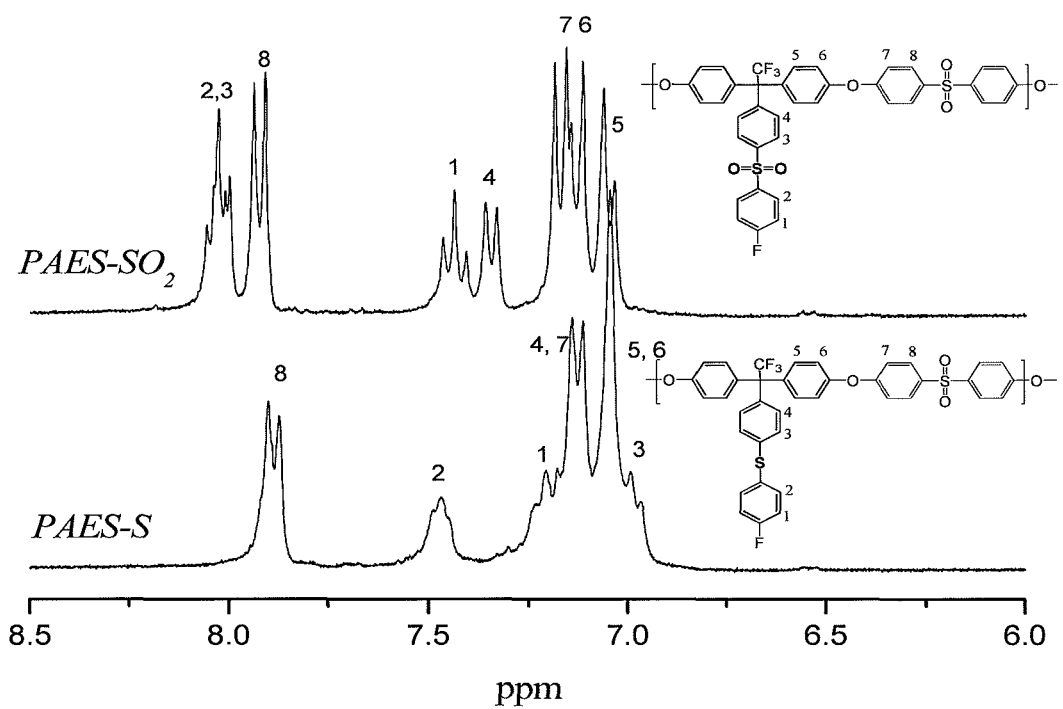
FIG. 2 shows $^1$H NMR spectra of the polymers PAES-S (bottom spectrum) and PAES-SO$_2$ (top spectrum). The spectral assignments indicated by numbers above the peaks in the spectrum; these numbers correspond to those shown in the formulas that appear directly above each of the two spectra. The scale of chemical shifts is the same for both top and bottom spectra to facilitate a comparison and indicate how the spectrum for PAES-S changes after it is oxidized to PAES-SO$_2$.

FIG. 2 shows the $^1$H NMR spectra of the PAES-S and PAES-SO$_2$ polymers. The spectra show that the ortho sulfonyl protons (H-2 and H-3) appear at higher frequencies than the respective thioether protons due to the deshielding effect of the sulfone groups, while the electron-rich ortho ether linkage protons appear at lower frequencies.

Figure 3:
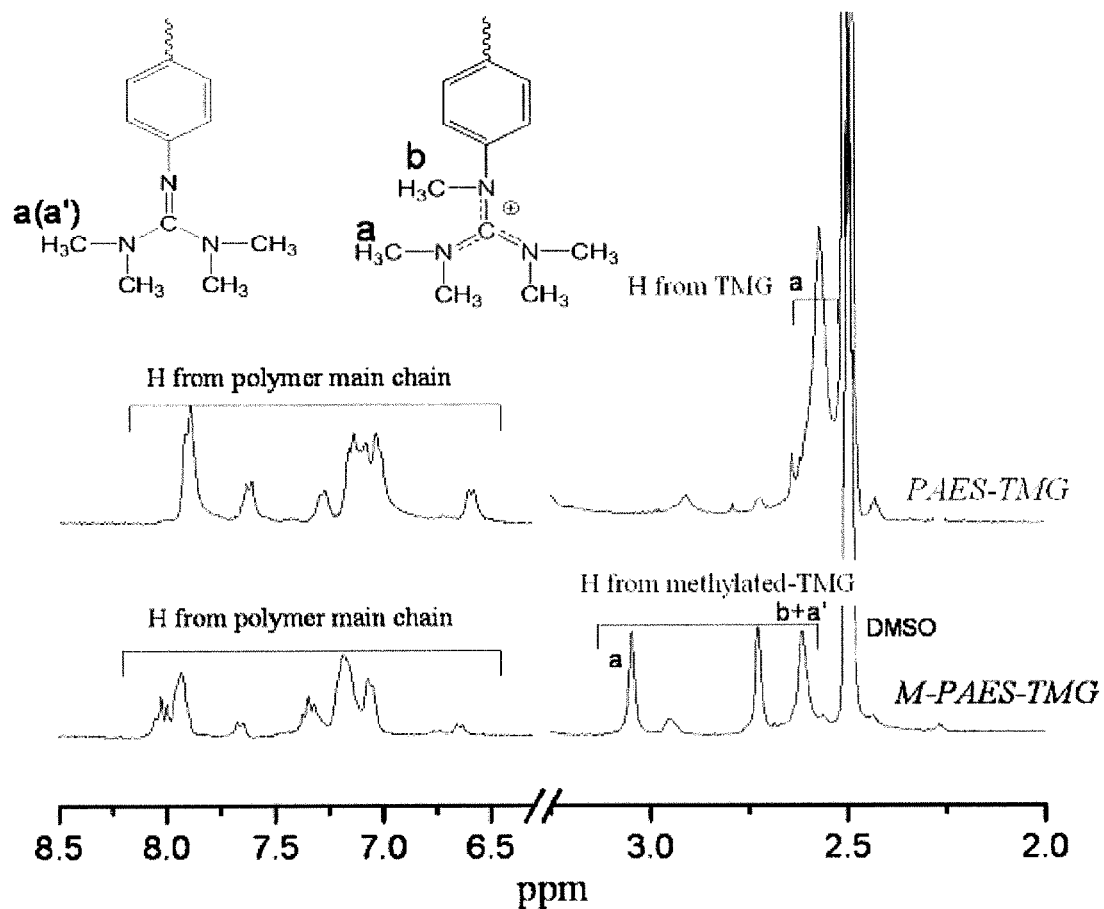
FIG. 3 shows $^1$H NMR spectra of PAES-TMG and M-PAES-TMG (methylated PAES-TMG). The peak assignments for the methyl groups a and a' and b are shown both in the formulas and indicated above the corresponding peaks in the spectra.
Figure 4:
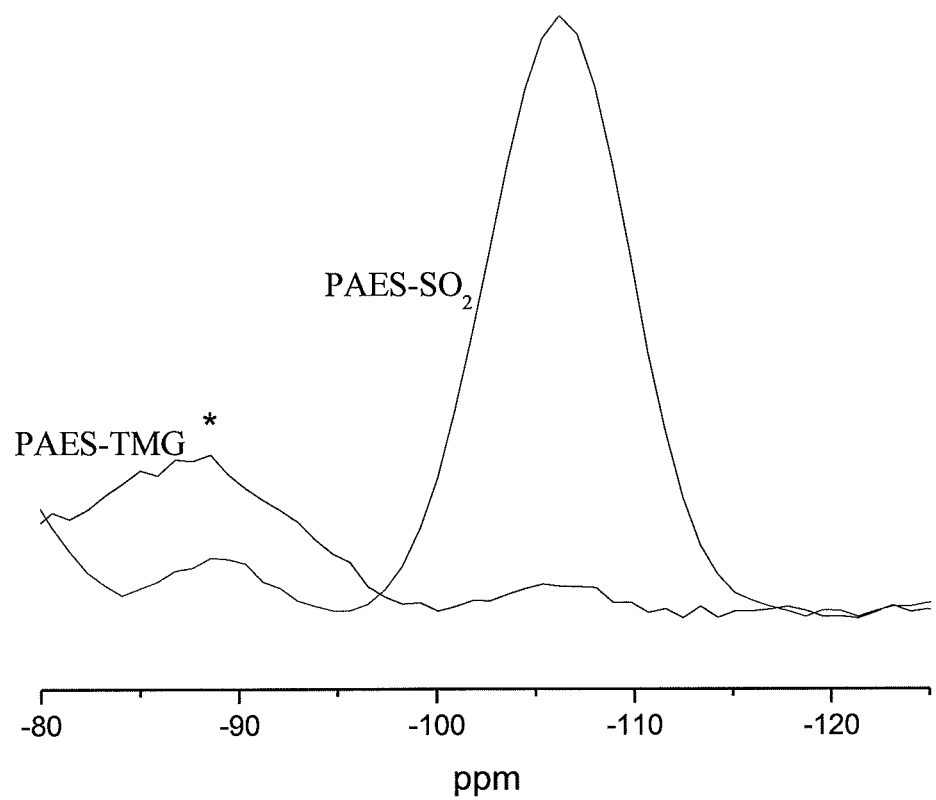
FIG. 4 shows $^{19}$F NMR spectra of PAES-SO$_2$ and PAES-TMG (* Spinning side band). Fluorine attached to phenyl group was observed at about 105 ppm. The yield of TMG attachment calculated from integration ratio is approximately 98.6%.
Figure 5:
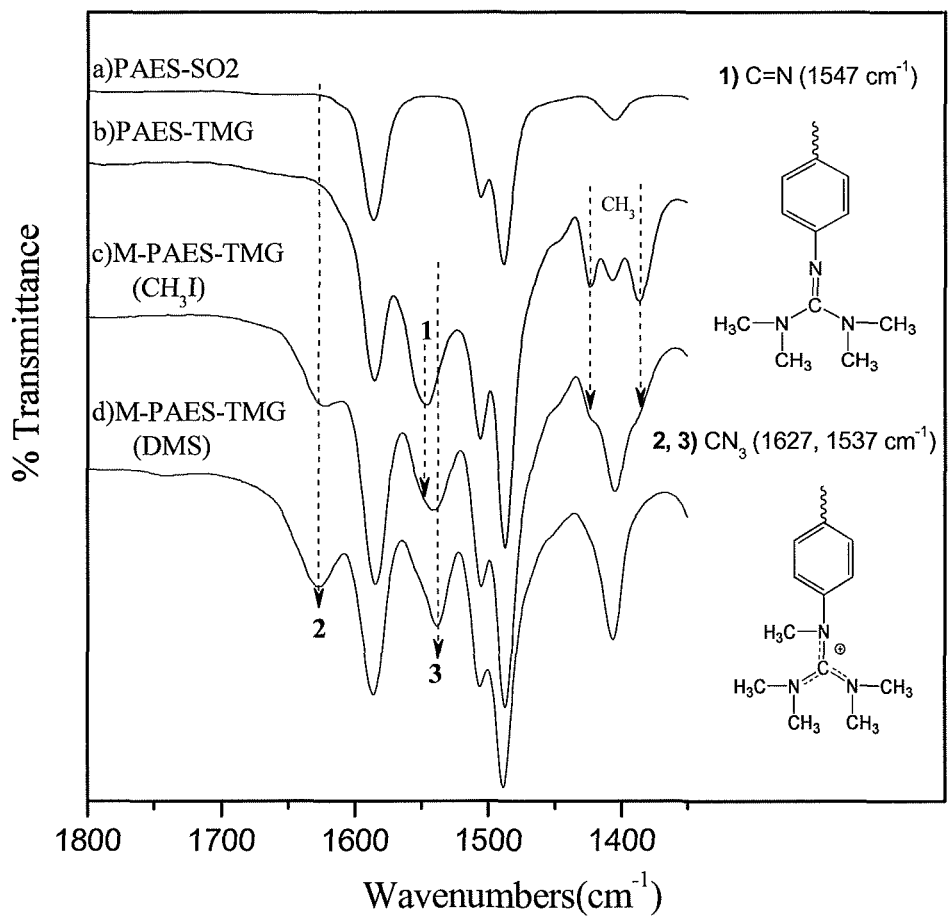
FIG. 5 shows four FT-IR spectra of the following four polymers: a) PAES-SO$_2$, b) PAES-TMG, c) M-PAES-TMG (methylated by CH$_3$I) and d) M-PAES-TMG (methylated by DMS). The FT-IR spectrum of polymer c), which has the $^1$H NMR spectrum shown at the bottom of FIG. 3, includes broad spectral bands at 1547, 1423, 1386 cm$^{-1}$ as well as a low intensity of the CN$_3$ band at 1627 cm$^{-1}$ due to low methylation yield.

The $^1$H NMR spectra of PAES-TMG and M-PAES-TMG are shown in FIG. 3. The signal from the methyl (—CH$_3$) protons of PAES-TMG appeared at δ 2.5-2.7. The yield of TMG attachment was calculated from the integration ratio of H (6.5 ppm -8.3 ppm -Benzene ring, 24 H) to H (2.5-2.7 ppm-TMG, 12 H), which was 2:0.99 (theoretical ratio is 2:1), indicating that a yield of TMG attachment of nearly 100%. This agrees with the yield calculated from the $^{19}$F NMR spectra shown in FIG. 4 by the integration ratio of fluorine of polymer before and after fluorophenyl-amine reaction. After methylation, the —CH$_3$ signal of PAES-TMG was shifted to higher frequencies (δ 3.0-3.1) due to deshielding from the quaternary nitrogen atom. An enhanced —CH$_3$ signal of M-PAES-TMG was observed at δ 2.6-2.8 after methylation, which includes integrates for all of the methyl groups of M-PAES-TMG. The methylation degree was calculated from the integration ratio of H (benzene ring, 24 H) to H (methyl groups, 15 H) of PAES-TMG. The theoretical integration ratio of the protons from δ 6.5-8.3 to the protons from δ2.55-3.1 of M-PAES-TMG is 1.6:1 and the signal integration ratio (FIG. 3) was close to 1.6:0.85 (i.e. the methylation degree: 85%). This gives a calculated ion exchange capacity (IEC) of 1.03 meq/g for M-PAES-TMG. The methylation using CH$_3$I was less effective and produced <60% yield. FT-IR spectra shown in FIG. 5 confirmed the conjugation of phenyl-pentamethyl guanidinium after methylation of PAES-TMG to form M-PAES-TMG; the C=N absorption at 1547 cm$^{-1}$ decreased, while the CN$_3$ conjugation absorption (1627, 1537 cm$^{-1}$) emerged.

Figure 6:
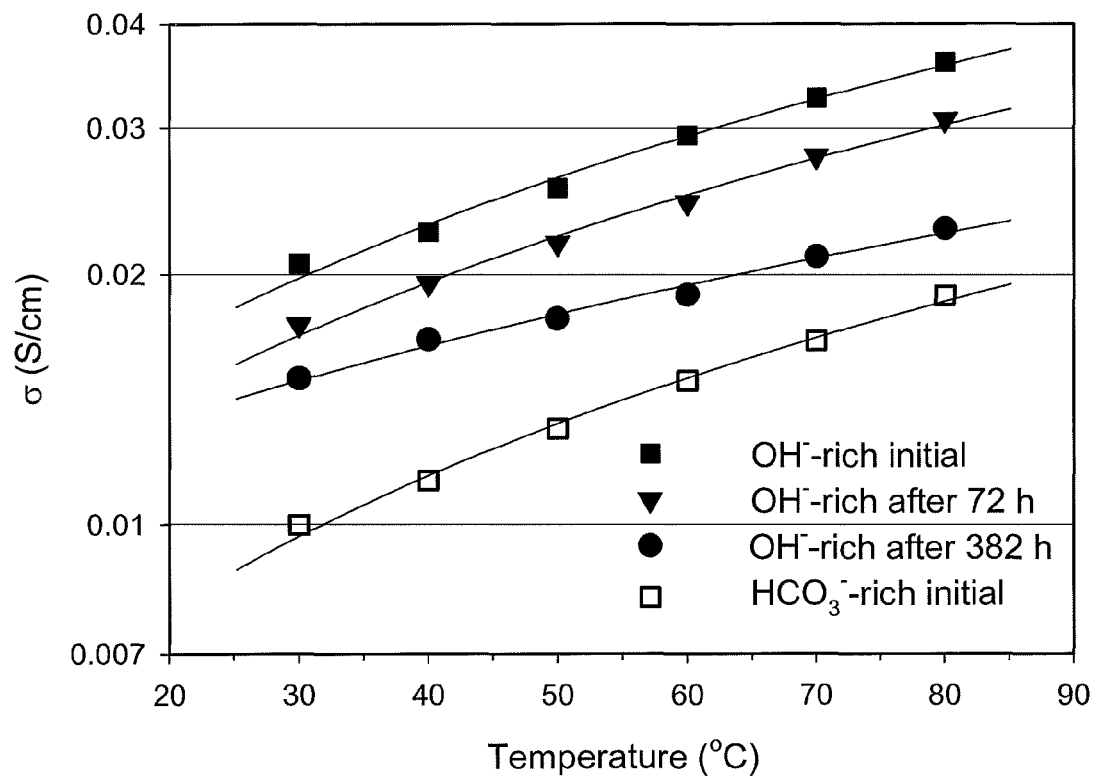
FIG. 6 shows the anion conductivity (σ) of M-PAES-TMG as a function of temperature before stability test (filled squares), after 72 h life test (filled triangles), after 382 hours life test under hydroxide-rich environment (filled circles) and before stability test under bicarbonate-rich environment (unfilled squares).
Figure 7:
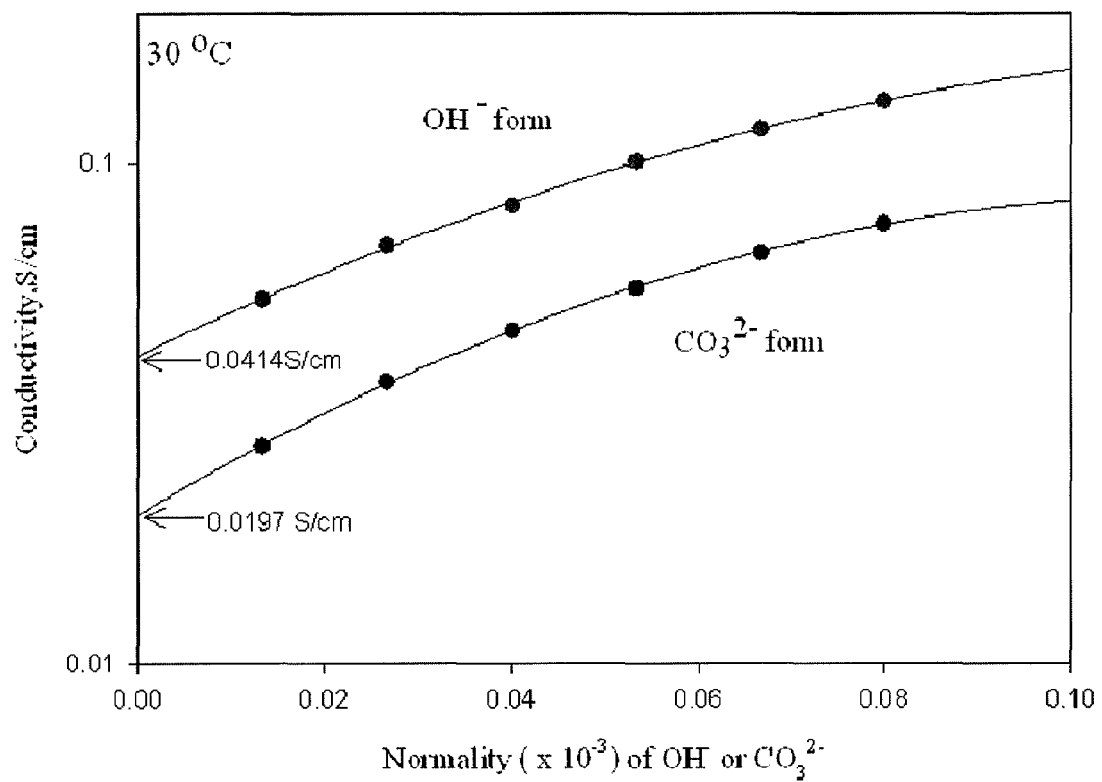
FIG. 7 shows conductivities plotted as a function of NaOH and K$_2$CO$_3$ concentration.

The anionic conductivity was measured in two different conditions (hydroxide- and bicarbonate-rich environments). The hydroxide-rich environment was achieved by boiling deionized water and purging N$_2$ gas in a temperature/humidity control chamber while the bicarbonate-rich environment was obtained after 24 hours exposure of deionized water to ambient air. FIG. 6 showed that the conductivity under a hydroxide-rich environment was about two-fold greater than the conductivity under a bicarbonate-rich environment and the conductivities increased linearly with temperature. Anion conductivity of M-PAES-TMG was also measured in NaOH and $K_2CO_3$ solution as a function of NaOH and $K_2CO_3$ concentration (FIG. 7). In the experimental concentration range (0.01-0.1 N), the conductivity in NaOH solution is about two-fold greater than the conductivity in $K_2CO_3$ solution [8]. Considering the infinite diffusion coefficient of hydroxide ion is 3.7 and 5.8 times higher than those of carbonate and bicarbonate ions, respectively [8, 20] this result suggests other factors such as cation-anion interaction or insufficient equilibrium time [8] may also impact the anion mobility. The water uptake of M-PAES-TMG was only 10 weight percent (wt %) at 30° C. which was notably lower than that of benzyl-trialkyl ammonium functionalized polymers. The reported the water uptake of benzyl-trialkyl ammonium functionalized polymers with similar conductivities (about 12mS/cm) was about 60 wt % when measured under the same conditions [5, 7].

Figure 8:
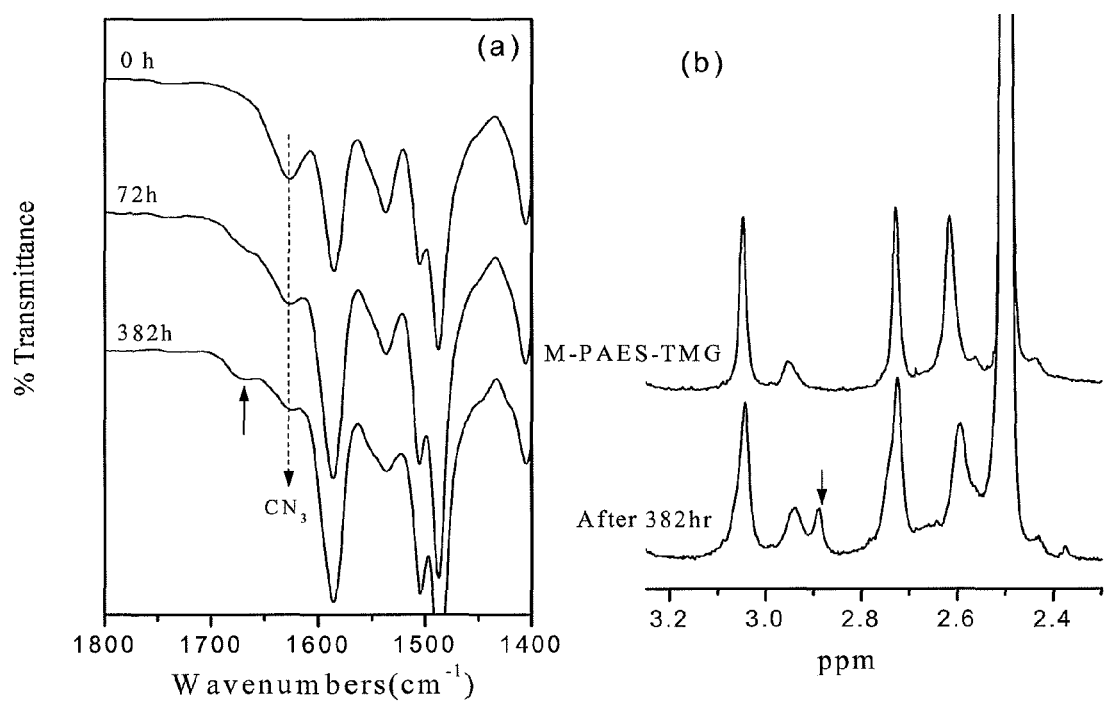
FIG. 8a shows a FT-IR spectrum.
FIG. 8b shows a $^1$H NMR spectrum, after a stability test in NaOH at 80° C.

The stability of M-PAES-TMG was evaluated by immersion of the membrane into 0.5 M NaOH solution at 80° C. The anionic conductivity of M-PAES-TMG slightly decreased from 36 to 31 mS/cm after 72 hours (14%) and further decreased to 23 mS/cm after 382 h (36%). FIG. 8a and FIG. 8b show FT-IR spectral results which include a gradual decrease in the $CN_3$ conjugation band along with the appearance of a new absorption at 1673 cm$^{-1}$ in FT-IR; a new peak at 2.88 ppm in $^1$H-NMR also appeared during the stability test. The IEC of M-PAES-TMG calculated from $^1$H NMR also decreased from 1.03 to 0.77 milliequivalents/g after 382 hours (25%). Without wishing to be bound by any particular theory or explanation, it is believed that because of the strongly electron-withdrawing sulfone group connected to the phenyl-guanidinium, the electron density of the central carbon of the guanidinium reduces its susceptibility to $S_N2$ reaction (Scheme 2) [21]. Nevertheless, there was no evident degradation on the a-carbon-nitrogen bond found in other alkyl ammonium functionalized polymers.

μV/dec h), while the Tafel-slope of the MEA using benzyl-trimethyl-ammonium-tethered poly(arylene ether) ionomer (FIG. 10b) increased 20.7 mV/decade (69 μV/dec h). Relatively insignificant degradation for both ionomers in the fuel cell lifetime test is possibly attributed to the absence of NaOH solution and lower operating temperature.

Additional description regarding experimental details, spectroscopic data, polarization curves and proposed degradation mechanism are described below.

4,4'-Difluorodiphenylsulfone (DFS), 1,1,3,3-tetramethylguanidine (TMG), dimethyl sulfate (DMS) were purchased from SIGMA-ALDRICH. 4-Fluoro-2,2,2-trifluoroacetophenone (F3FAP), trifluoromethanesulfonic acid (triflic acid) and 4-fluorothiophenol (FTP) were purchased from OAKWOOD PRODUCTS INC.

(1,1-bis(4-hydroxyphenyl)-1-(4-((4-fluorophenyl)thio) phenyl-2,2,2-trifluoroethane) (3FBPT) was synthesized from 4-fluoro-2,2,2-trifluoroacetophenone (F3FAP), 4-fluorothiophenol (FTP), and phenol according to a method in the literature [17, 18] Yield: 96%. $^1$H NMR (DMSO-d$_6$, ppm) 9.63 (s, 2H), 7.52 (dd, 2H), 7.29 (t, 2H), 7.18 (d, J=8.8 Hz, 2H), 7.00 (d, J=8.8 Hz, 2H), 6.80 (d, J=8.8 Hz, 4H), 6.74 (d, J=8.8 Hz, 4H); $^{19}$F NMR (DMSO-d$_6$, ppm) −57.9 (s, 3F), −112.5 (m, 1F).

Poly(arylene ether sulfone)s (PAES-S and PAES-SO$_2$) were synthesized as follows: in a typical synthetic procedure, illustrated by the preparation of PAES-S polymers, 10 mmol DFS, 10 millimoles (mmol) 3FBPT, and 12 mmol $K_2CO_3$ were added into a three-neck flask equipped with a magnetic stirrer, a Dean-Stark trap, and an $N_2$ gas inlet. Then, 15 mL DMAc and 15 mL of toluene were charged into the reaction flask under an $N_2$ atmosphere. The reaction mixture was heated to 145° C. After dehydration and removal of toluene, the reaction temperature was increased to about 165° C. The resulting polymer was washed thoroughly with water or ethanol several times and dried under vacuum at 100° C. for 24 hours (h). The polymer was denoted as PAES-S. In a typical oxidation procedure, PAES-S polymer (3.0 grams (g)) was Scheme 2

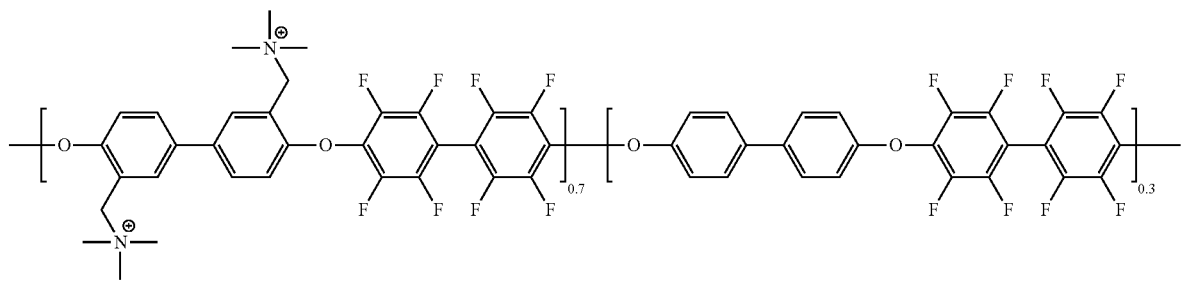

Figure 9:
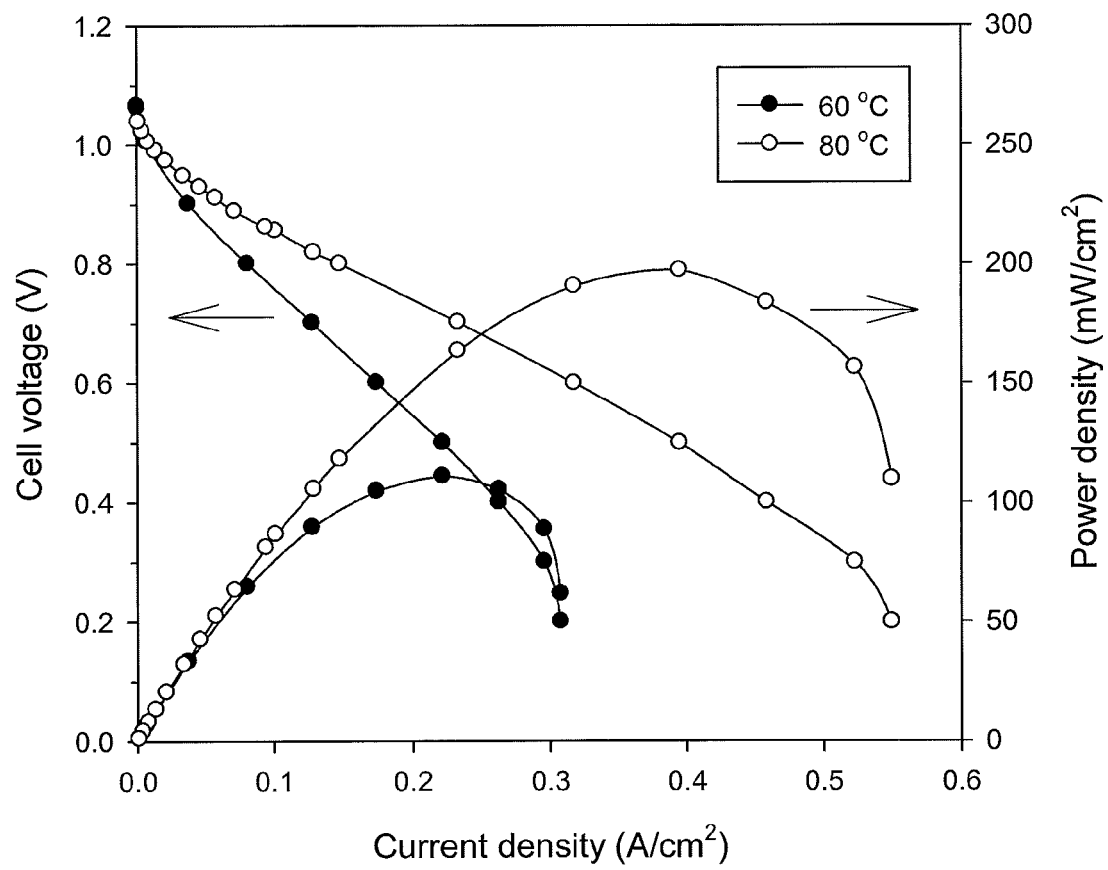
FIG. 9 shows H$_2$/O$_2$ polarization curves of AMFCs using M-PAES-TMG in the catalyst layer. Membranes: quaternary ammonium functionalized polyphenylene, anode and cathode catalysts Pt black 3.4 and 6.5 mgPt/cm$^2$, respectively. Polarization curves are obtained under fully humidified conditions with 30 psi back pressure.

FIG. 9 shows a plot of cell voltage (volts) versus current density (A/cm$^2$) for embodiment AMFCs using M-PAES-TMG as electrode ionomers (i.e. binders for electrocatalysts). The plot shows that these embodiments drew significant currents with platinum catalysts under $H_2/O_2$ conditions (ca. the peak power density at 80° C. was approximately 200 mW/cm$^2$). The embodiment AMFC using the M-PAES-TMG ionomer exhibited good stability compared with the stability with a benzyl-trimethyl ammonium functionalized ionomer.

Figure 10A:
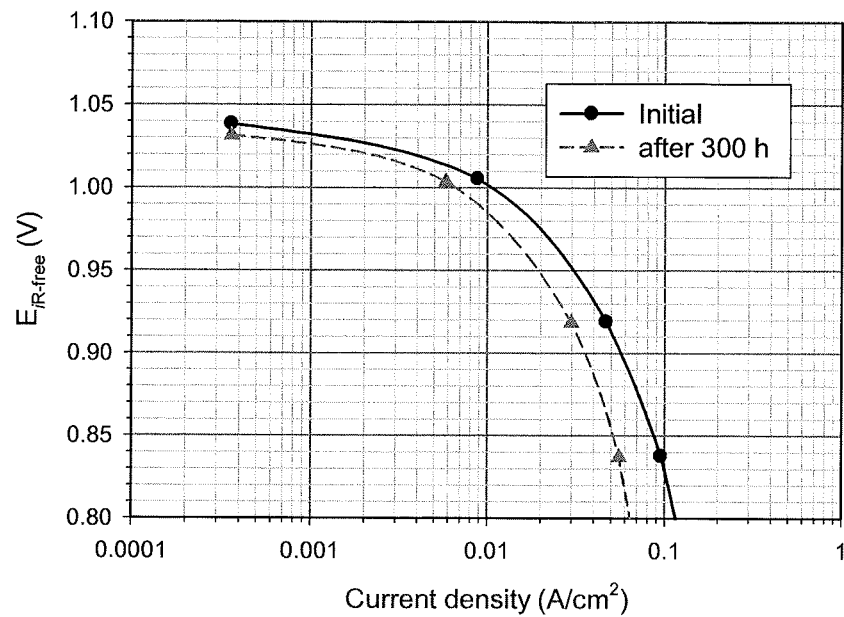
FIG. 10a and FIG. 10b show iR-free H$_2$/O$_2$ polarization curves of AMFCs using M-PAES-TMG (FIG. 10a) and benzyl-trimethyl ammonium functionalized poly(arylene ether) (FIG. 10b) in the catalyst layers before and after 300 hour lifetime test. Measurements were taken at T$_{cell}$=60° C. under fully humidified conditions (60° C. and 70° C. due point for anode and cathode, respectively, reactant backpressure at 30 psi).
Figure 10B:
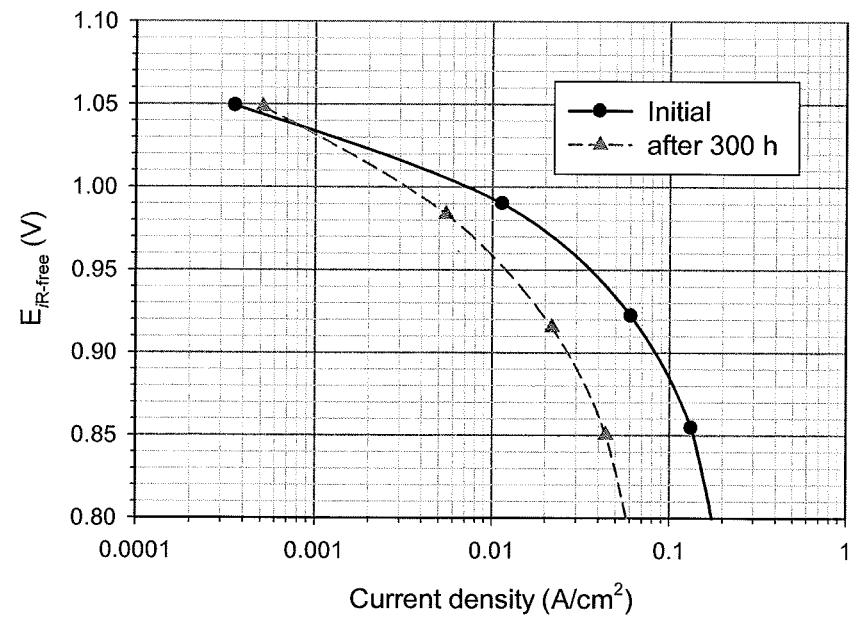

FIG. 10a and FIG. 10b compare the Tafel-slope change at high voltage during the test in order to quantify the ionomer stability, with the assumption that the degradation of high loading-platinum black catalyst is negligible. The Tafel-slope at 0.96 V of MEA using M-PAES-TMG (FIG. 10a) as electrode ionomer increased only 0.7 mV/decade after 300 h (2 added into 130 mL formic acid and 13 mL 30% hydrogen peroxide were added dropwise at 40° C. The heterogeneous dispersion was stirred vigorously for 1.5 h. The polymer was denoted PAES-SO$_2$.

PAES-TMG and methylated PAES-TMG were synthesized as follows: 20 mL of DMAc, 5 mL of toluene, and 2 mL of TMG were added into a three-neck flask equipped with a magnetic stirrer, a Dean-Stark trap and an $N_2$ gas inlet. The reaction mixture was heated to 130° C. for 2 h to remove the water from the reaction system by the azeotropic distillation of toluene. PAES-SO$_2$ polymer was added into reaction solution and reacted for 24 hours. The resulting polymer was washed thoroughly with water or ethanol several times and dried under vacuum at 100° C. for 24 hours. The polymer was denoted PAES-TMG. A PAES-TMG polymer thus obtained was treated with DMS in DMAc at 90° C. The methylated PAES-TMG polymer was washed with water several times. The polymer was denoted M-PAES-TMG. Membranes were prepared by redissolving the M-PAES-TMG polymer in DMAc at 80° C. and casting directly onto clean glass substrates to form ca. 50-μm thick membranes after evaporating the solvent slowly on a hot plate. The M-PAES-TMG membranes were then immersed in a 0.5 M sodium hydroxide aqueous solution for 48 h at room temperature and rinsed with deionized water several times.

Benzyl-trimethyl ammonium functionalized poly(arylene ether)s (F-PAE) was synthesized as follows (see Scheme 2, vide supra): 10 mmol decafluorobiphenyl (DFBP), 3 mmol 4,4'-biphenol (BP), 2,2'-bimethylaminemethylene-4,4'-biphenol (DABP) and 21 mmol $K_2CO_3$ were added into a three neck flask equipped with a magnetic stirrer, a Dean-Stark trap, and a nitrogen gas inlet. Then, 35 mL DMAc was charged into the reaction flask. The reaction mixture was heated to 90° C. When the solution viscosity had apparently increased, the mixture was cooled to room temperature and coagulated into a large excess of water with vigorous stirring. The precipitated copolymer was washed several times with water and dried in a vacuum oven at 90° C. for 24 h. F-PAE was dissolved in 20 mL of DMAc, and then iodomethane was added and stirred overnight at room temperature. The reaction mixture was poured into HCL (0.1 M) solution. The precipitate was filtered and washed with distilled water thoroughly, and dried in an oven for 24 h at 100° C. The F-PAE was used as control sample. The IEC (meq./g), water uptake (20° C.) and ion conductivity (80° C.) of F-PAE are 2.4 meq./g, 26 wt. %, and 35 mS/cm, respectively.

$^1$H NMR and $^{19}$F NMR spectra were recorded using a VARIAN UNITY INOVA spectrometer at a resonance frequency of 399.96 MHz for $^1$H. Signals from DMSO-$d_6$ were used as the reference for $^1$H (2.50 ppm (DMSO)). The FT-IR spectra of the membranes were, measured using a NICOLET IR 8700 spectrometer (THERMO NICOLET, Madison, Wis., USA).

The anion conductivities of the membranes were estimated from AC impedance spectroscopy data using a SOLARTRON 1260 gain phase analyzer. The conductivity (OH$^-$ rich environments) was measured in water treated with $N_2$ gas at boiling temperature to remove $CO_2$ gas. The conductivity ($HCO_3^-$ rich environments) was also measured after exposure of the membrane to ambient air for 24 hours.

The conductivities in basic solution and carbonate solution were also measured as a function of concentration of NaOH and $K_2CO_3$ at 30° C. As shown in FIG. 7, the conductivities increased with NaOH and $K_2CO_3$ concentration at 30° C. The conductivity in NaOH solution was about two-fold higher than the conductivity in $K_2CO_3$ solutions, showing the similar results of OH$^-$ rich and $HCO_3^-$ rich conditions.

M-PAES-TMG membranes were immersed in 0.5 M NaOH at 80° C. for 382 hours. Then, the membrane was washed several times with deionized water. The membrane stability was confirmed by FT-IR, NMR and conductivity analysis.

An aspect of the present invention is concerned with a membrane electrode assembly (MEA) comprising aminated polymer and catalyst. The term "catalyst" means a catalyst that when incorporated into electrode facilitates an electrochemical reaction. These catalysts are also referred to as "electrocatalysts". The catalyst may be applied in the form of a dispersion of the catalyst known as an ink. The catalyst may be applied to the polymer using a method such as direct painting of catalyst ink on to membrane, decal transfer, spray painting, screen printing, roll coating, hot pressing, and the like. Concentrations of the polymer electrolytes in the liquid medium is not particularly limited, and may be properly determined depending on a combination of the solvent and said compounds, amounts used to the electrode catalyst, viscosity, permeability at applying it, etc., but it is preferably 0.1 to 20 mass %, particularly preferably 0.5 to 10 mass %, as a total mass % of both of the compounds in a liquid medium. Using these fabrication methods, highly stable and durable interface between membrane and electrode can be obtained. Membrane electrode Assemblies were prepared. Platinum black catalysts (Johnson Matthey) were used for the cathode and anode, respectively. The geometric active cell area was 5 $cm^2$. Double-sided hydrophobic carbon cloths (E-TEK, Inc.) were used as anode and cathode gas diffusion layers, respectively. Highly conductive tetraalkylammonium functionalized poly(phenylene) membranes (thickness=50 μm) were used as anion exchange membrane instead of the M-PAES-TMG. The tetraalkylammonium membranes have higher anionic conductivity (about 0.1 S/cm at 80° C.). Pt black catalysts were mixed with M-PAES-TMG or F-PAE (1.5 wt % NMP:Glycerol (1:1 wt.)) solution. The catalyst inks were painted on the membrane surface. The catalyst loading for anode and cathode were 3.4 and 6.5 mg/$cm^2$, respectively. The MEA was immersed into 0.5 M NaOH solution for 1 h, following the washing with water at 80° C. several times. Initial polarization curves for the MEA using the PAES-TMG ionomer (FIG. 10) were obtained after 15 hour break-in at $T_{cell}$60 and 80° C. The iR-free cell voltage, $E_{iR-free}$ was determined by on-line high frequency resistance measurements. The AMFC life test was performed under constant voltage of 0.3 V at 60° C. under fully hydrated conditions (i.e. 60° C. due point for both electrode humidifiers). After the 300 h continuous life test, polarization curves were obtained at $T_{cell}$=60° C. under fully humidified conditions.

Embodiments of the invention also include hydrogen/air fuel cells or hydrogen/oxygen fuel cells. The anode of a $H_2$/air fuel cell sometimes referred to as the hydrogen electrode. The cathode is sometimes referred to as the oxygen electrode. In an embodiment, an anode of a SAFC is a composite a catalyst (e.g. carbon, transition metal(s), oxides of transition metal(s), and the like) and an ionomer binder that is an embodiment alkylguanidinium-functionalized polymer (e.g. M-PAES-TMG).

In summary, polymers having guanidinium functional groups have been prepared. They exhibited highly efficient anion conductivity and stability in high pH conditions. An embodiment AMFC used the polymer as an electrode ionomer, wherein it acted as a binder for the electrocatalyst. This AMFC exhibited superior stability to traditional benzyl-trimethyl functionalized polymer. Electrodes with these polymers can be used with precious metal electrocatalysts as well as base metal electrocatalysts. These polymers can be also be used as membranes in electrochemical cells such as fuel cells.

Although the present invention has been described with reference to specific details, it is not intended that such details should be regarded as limitations upon the scope of the invention, except as and to the extent that they are included in the accompanying claims.

The following references are incorporated by reference herein.

REFERENCES (1) Varcoe et al., Fuel Cells, 2005, vol. 5, p. 187.
(2) Spendelow et al., *A. Phys. Chem. Chem. Phys,* 2007, vol. 9, pp. 2654-2675.
(3) Lu et al., *PNAS,* 2008, vol. 105, pp. 20611-20614.
(4) Varcoe et al., *Chem. Mater.* 2007, vol. 19, pp. 2686-2693.
(5) Hibbs et al., *Chem. Mater,* 2008, vol. 20, pp. 2566-2573.
(6) Pan et al., *Adv. Funct. Mater,* 2010, vol. 20, pp. 312-319
(7) Tanaka et al., *Macromolecules,* 2010, vol. 43, pp. 2657-2659.
(8) Yan et al., *Macromolecules,* 2010, vol. 43, pp. 2349-2356.

(9) Robertson et al., *J. Am. Chem. Soc.*, 2010, vol. 132, pp. 3400-3404.
(10) Bauer et al, *Desalination,* 1990, vol. 79, pp. 125-144.
(11) Chempath et al., *J. Phys. Chem. C* 2008, vol. 112, pp. 3179-3182.
(12) (a) Pivovar et al., U.S. Pat. No. 7,439,275 (2008).
 (b) Pivovar et al., U.S. Pat. No. 7,846,980 (2010).
(13) (a) Wang et al., *Macromolecules,* 2010, vol. 43, pp. 3890-3896.
 (b) Zhang et al., S. Chem. Comm. 2010, vol. 46, pp. 7495-7497.
(14) Gu et al., *Angew. Chem. Int. Ed.* 2009, vol. 121, pp. 6621-6624.
(15) Hibbs et al., North American Membrane Society (HAMS) meeting 2011, Jun. 4-8, 2011, Las Vegas.
(16) Chempath et al., *J. Phys. Chem. C* 2010, vol. 114, pp. 11977-11983.
(17) Li et al., *Macromolecules,* 2006, vol. 39, pp. 6990-6996.
(18) Kim et al., *Macromolecules,* 2008, vol. 41, pp. 2126-2134.
(19) Zhou et al., *J. Memb. Sci.* 2010, vol. 350, pp. 286-292.
(20) Cussler et al., Diffusion, mass transfer in fluid systems, $2^{nd}$ ed. Cambridge University Press 1997, p. 550.
(21) Huczynski et al., *J. Mole. Struc.* 2010, vol. 967, pp. 65-71.
(22) Huczynski, A.; Janczak, J.; Brzezinski, B.; *J. Mole. Struc.* 2010, vol. 967, pp. 65-71.
(23) Hibbs et al., *Chem. Mater,* 2008, vol. 20, pp. 2566-2573.
(24) Wang et al., *Macromolecules,* 2009, vol. 42, pp. 8711-8717.

What is claimed is:
1. A composition having the formula

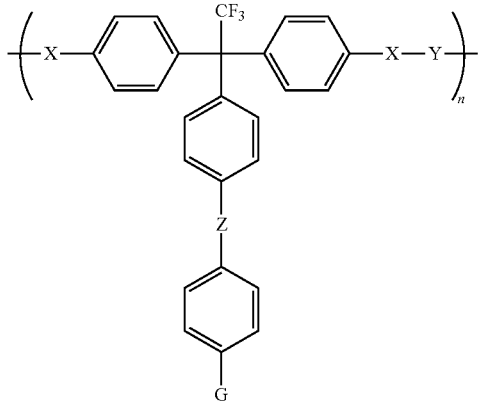

wherein X is S or O;
wherein Y is

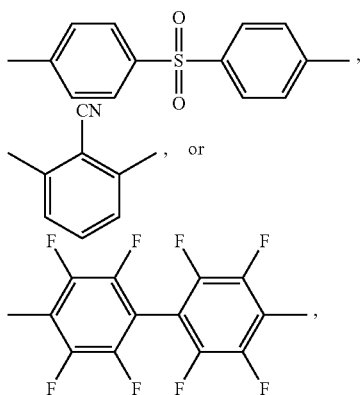

wherein Z is $SO_2$ or S,
wherein n is from 1 to 1000, and
wherein G comprises guanidine or guanidinium, said guanidine having the formula

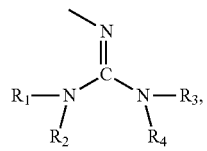

said guanidinium having the formula

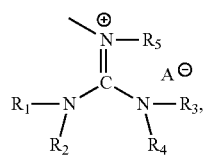

wherein $R_1$, $R_2$, $R_3$, and $R_4$ are each independently selected from —H, —$CH_3$, —$NH_2$, —N(=O), —$NO_2$, —CN, —(CH)$_m$$CH_3$ wherein m=1-6, HC(=O)—, $CH_3$C(=O)—, $NH_2$C(=O)—, —(CH$_2$)$_m$COOH where m=1-6, —(CH$_2$)$_m$CH(NH$_2$)—COOH where m=1-6, —CH—(COOH)—$CH_2$—COOH, —$CH_2$—CH(O—$CH_2$$CH_3$)$_2$, —(C=S)—$NH_2$, —(C=NH)—N((CH$_2$)$_{n1}$(CH$_3$)((CH$_2$)$_{n2}$(CH$_3$)) where $n_1$=0-6 and $n_2$=0-6, —NH—(C=S)—SH, —$CH_2$—C(=O)—O—C(CH$_3$)$_3$, —O—(CH$_2$)$_m$—CH(NH$_2$)—COOH, where m=1-6, —(CH$_2$)$_m$—CH=$CH_2$ wherein m=1-6, —(CH$_2$)$_m$—$CH_2$—CN where m=1-6, an aromatic group, a halide, or halide-substituted methyl group,
wherein $R_5$=alkyl, and
wherein $A^-$ is a counterion.

2. The composition of claim 1, wherein $R_5$ is methyl or ethyl.

3. The composition of claim 1, wherein the counterion A- is selected from hydroxide, carbonate, bicarbonate, fluoride, chloride, bromide, iodide, $IO_3^-$, $SO_4^{-2}$, $HSO_3^-$, $H_2PO_4^-$, $NO_3^-$, and $CH_3OSO_3^-$.

4. The composition of claim 1,
wherein X=O,
wherein

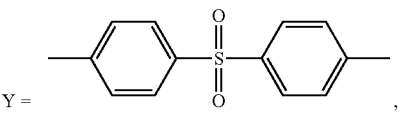

wherein Z=$SO_2$,
wherein

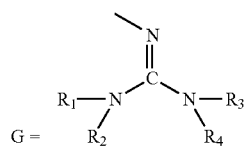

wherein $R_1$=$R_2$=$R_3$=$R_4$=—$CH_3$.

5. The composition of claim 1,
wherein X=O,
wherein
Y = 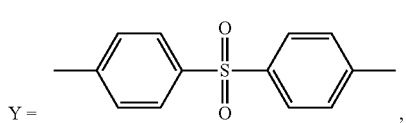 ,
wherein Z=SO$_2$,
wherein
G = 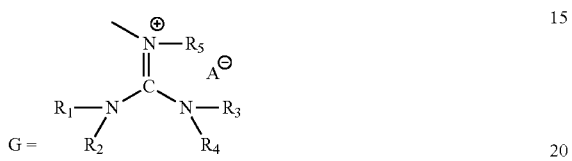
wherein $R_1=R_2=R_3=R_4=R_5=$—CH$_3$, and
wherein A$^-$ is CH$_3$OSO$_3^-$ or OH$^-$.
6. The composition of claim 1, wherein n is at least 5.
7. The composition of claim 1, wherein n is from about 10 to about 100.
8. The composition of claim 1, wherein n is about 50.
* * * * *